United States Patent [19]
Hebeda et al.

[11] 3,922,201
[45] Nov. 25, 1975

[54] PREPARATION OF LEVULOSE FROM GRANULAR STARCH

[75] Inventors: Ronald Emil Hebeda, Woodridge; Harry Woods Leach, Chicago, both of Ill.

[73] Assignee: CPC International Inc., Englewood Cliffs, N.J.

[22] Filed: July 12, 1973

[21] Appl. No.: 378,738

[52] U.S. Cl. ............. 195/31 F; 195/31 R; 195/111; 195/115
[51] Int. Cl.² .......................................... C12D 13/02
[58] Field of Search .............. 195/31 R, 31 F, 11, 7, 195/111

[56] References Cited
UNITED STATES PATENTS

| | | | |
|---|---|---|---|
| 2,583,451 | 1/1952 | Wallerstein et al. | 195/11 |
| 3,039,936 | 6/1962 | Lenny et al. | 195/31 R |
| 3,645,848 | 2/1972 | Lee et al. | 195/31 F |
| 3,720,583 | 3/1973 | Fisher | 195/31 R |
| 3,804,716 | 4/1974 | Langlois | 195/31 R |

FOREIGN PATENTS OR APPLICATIONS

| | | | |
|---|---|---|---|
| 11,897 | 1965 | Japan | 195/31 R |
| 4,716,654 | 9/1972 | Japan | 195/31 R |
| 4,822,643 | 3/1973 | Japan | 195/31 R |
| 7,137,231 | 11/1971 | Japan | 195/31 F |

OTHER PUBLICATIONS

Chem Abstracts 74:139529a.

Outtrup et al., "α–Amylase from Bacillus licheniformis," Chemical Abstracts Vol. 74. p. 226, 52158(e) (1971).

Leach et al., "Structure of the Starch Granule," Cereal Chemistry, Vol. 38, pp. 34–46 (Jan., 1961).

*Primary Examiner*—A. Louis Monacell
*Assistant Examiner*—Thomas G. Wiseman
*Attorney, Agent, or Firm*—Donald G. Marion; Albert P. Halluin

[57] ABSTRACT

A process for the preparation of levulose-containing compositions from granular starch involving the joint use of alpha-amylase, glucoamylase and glucose isomerase. The process is carried out under such conditions as to avoid gelatinization of the starch.

16 Claims, No Drawings

PREPARATION OF LEVULOSE FROM GRANULAR STARCH

The invention of this application relates to the conversion of starch to levulose, and in particular, to such conversion which is effected wholly by enzymes.

BACKGROUND OF THE INVENTION

Starch is a polymeric carbohydrate material of very high molecular weight. Its monomeric units are termed anhydroglucose units, and the complete hydrolysis of starch yields dextrose. Dextrose in turn is susceptible of isomerization to levulose, either by alkaline or enzyme catalysis. The latter is of increasing importance at the present time because of recent improvements in the conversion of dextrose to levulose by means of enzyme catalysis.

Of all the "sugar" consumed throughout the world, sucrose is by far the most commonly used. It is what is commonly known as table sugar. It is a remarkably stable product and has very good sweetening properties. It is not entirely without shortcomings, however, because at high concentrations it does tend to crystallize and thus adversely affects the texture and appearance of foods in which it is contained. Furthermore, its sweetness is said by some to lack depth and fullness. Dextrose is an alternative, but dextrose lacks the high degree of sweetness which characterizes sucrose. Dextrose is generally rated as being about 60 to 80% as sweet as sucrose and the price at which dextrose is sold is correspondingly lower than that of sucrose. Like sucrose, dextrose tends to crystallize easily.

Levulose, on the other hand, is even sweeter than sucrose, and it does not have the undesirable tendency to crystallize readily.

Unfortunately, levulose does not occur naturally in large quantities and its preparation has heretofore been difficult. Its preparation from sucrose by hydrolysis with hydrochloric acid or with the enzyme invertase has long been known and this hydrolysis produces so-called invert sugar, half of which is levulose and the other half of which is dextrose.

The overall conversion of starch to levulose ordinarily involves three principal, separate steps: a thinning of the starch, followed by saccharification, followed in turn by isomerization. In the first step, an aqueous slurry of starch is heated to gelatinize the starch, and simultaneously, treated with an alphaamylase or acid, to convert it to an intermediate hydrolysis product having a considerably reduced viscosity with respect to that of the original pasted aqueous starch mixture. Then, in the second step, this intermediate hydrolysis product is saccharified, i.e., converted to dextrose by treatment with a saccharifying enzyme, i.e., a glucoamylase. In the third step, this dextrose product is treated with a glucose isomerase with the resulting formation of a product containing about half dextrose and half levulose, or with a base such as sodium hydroxide to produce a product containing a maximum of about 30% levulose.

Each of the above steps are carried out under different conditions of pH and temperature, so as to optimize the efficiency of each step. Thus, it is necessary to make significant adjustments in these conditions at the conclusion of each step, with the results that the overall efficiency of the process is considerably diminished.

It is accordingly a principal object of the present invention to provide an improved process for the conversion of starch to levulose.

It is another object of the present invention to provide such a process which results in high yields of levulose.

It is another object of the present invention to provide such a process which is characterized also by relatively low temperatures.

It is yet another object of the present invention to provide such a process which can be carried out conveniently and economically in one step.

SUMMARY OF THE INVENTION

These and other objects are accomplished by the process of converting starch to levulose comprising mixing a granular starch with water, bacterial alpha-amylase, glucoamylase, and glucose isomerase at a temperature of from about 40°C to about 70°C below the initial gelatinization temperature of the starch, and at a pH of from about 5.0 to about 7.0. Such process accomplishes the above objectives largely because of the combined synergistic action of the bacterial alpha-amylase, glucoamylase and glucose isomerase which results in efficient production of levulose at a single temperature and pH.

The starch may be any of those commonly available, including corn starch, waxy maize, tapioca, potato starch, white sweet potato starch, wheat starch, sago, sorghum and the like. Waxy and the non-waxy starches are suitable. As indicated, the starch is granular. Corn grits and other raw materials high in starch content may be used satisfactorily. Corn starch is a preferred raw material because of its ready availability.

An important advantage of the process is that it may be carried out in an aqueous slurry at relatively high concentrations. The solids content of the starch slurry generally is within the range of from about 10% to about 70%; ordinarily, the solids content will be 20–50%. Lesser concentrations can of course be used, and in general as the concentration is decreased, so is the extent of starch solubilization, and thus the yield of levulose is increased. As a practical matter, however, it is highly desirable in most instances to use small volumes, i.e., high concentrations of starch. This avoids or at least diminishes the considerable expense of concentrating the conversion mixture prior to ultimate separation of levulose. In some cases, however, the advantage of a higher yield may be sufficient to outweigh this disadvantage, and a concentration of about 10% solids would be preferred.

The process herein permits the solubilization of 90% or more of the starch in a 30–40% aqueous slurry. Furthermore, the undissolved starch can be recycled so as to improve the overall efficiency; i.e., to solubilize the previously undissolved starch and thereafter to convert it to levulose. An incidental advantage of such recycling step is the fact that a significant proportion of enzyme activity is thus also recovered. The solubilized starch thus obtained has a dextrose equivalent (D.E.) of 90–95. The term "D.E." is used to indicate the reducing sugar content of the isomerized hydrolysate, calculated as dextrose, and expressed as percent by weight of the dry substance present.

The bacterial alpha-amylase preferably is one which is active at a relatively low pH, i.e., within the range of from about 5.0 to about 7.0, and also at relatively low temperatures, i.e., below the temperature at which a particular starch gelatinizes. Preferred sources of such alpha-amylases include certain species of the Bacillus microorganism, viz., *B. subtilis*, *B. licheniformis*, *B. coagulans* and *B. amyloliquefaciens*. Suitable alpha-amylases are described in Austrian patent application No. 4836/70 and in U.S. Pat. No. 3,697,378. Especially suitable amylases are those derived from *B. licheniformis* as described in the above Austrian patent application. Particularly preferred is that alpha-amylase derived from *B. licheniformis* strain NCIB 8061; other specific microorganisms include *B. licheniformis* strains NCIB 8059, ATCC 6598, ATCC 6634, ATCC 8480, ATCC 9945A and ATCC 11945. One such alpha-amylase preparation is identified by the trade name "THERMAMYL", available from Novo Terapeutisk Laboratorium, Copenhagen, Denmark. THERMAMYL is characterized by the following properties:

a. it is thermally stable;
b. it has a broad range of pH activity; and
c. its activity and heat stability are independent of the presence of added calcium ion.

Analysis of a suitable preparation is as follows:

| | |
|---|---|
| Dry Substance, % | 94.6 |
| Alpha-amylase activity, U/g (as is) | 9,124 |
| Protein, % d.b. | 21.2 |
| Ash, % d.b. | 64.4 |
| Calcium, % d.b. | 4.9 |

Other suitable alpha-amylases include THERMAMYL 60 (a liquid) and THERMAMYL 120 (a solid) having the following analyses:

| | THERMAMYL 60 | THERMAMYL 120 |
|---|---|---|
| Dry Substance, % | 35.4 | 98.8 |
| Alpha-amylase activity, U/g (as is) | 1,156 | 2,105 |
| Protein, % d.b. | 26.5 | 21.2 |
| Ash, % d.b. | 60.1 | 91.2 |
| Calcium, % d.b. | 0.04 | 0.72 |
| Sodium, % d.b. | 12.3 | 12.2 |

Still other suitable alpha-amylases which are available include the following:

TABLE I

| Enzyme Preparation | Company | Form | Activity |
|---|---|---|---|
| Rhozyme H-39 | Rohm & Haas | Powder | 4,874 μ/g |
| Takamine HT-1000 | Miles | Powder | 3,760 μ/g |
| Tenase | Miles | Liquid | 2,043 μ/ml |
| Dex-Lo MM | Wallerstein | Liquid | 1,213 μ/ml |
| Novo SP-96 | Novo | Powder | 7,310 μ/g |
| Novo B. substilis | Novo | Liquid | 1,599 μ/ml |
| Kleistase GM-16 | Daiwa Kasai | Powder | 26,593 μ/g |
| Kleistase L-1 | Daiwa Kasai | Liquid | 1,918 μ/ml |
| Rapidase SP-250 | Societe "Rapidase" France | Powder | 11,655 μ/g |

The amount of bacterial alpha-amylase to be used ranges from about 1.0 to about 25 units per gram of starch (dry basis). The use of larger amounts provides no practical advantage; the increased starch solubilization which results from the use of more than 25 units per gram does not justify the additional cost of enzyme.

The alpha-amylase activity of an enzyme is determined as follows:

The enzyme is allowed to react with a standard starch solution under controlled conditions. Enzyme activity is determined by the extent of starch hydrolysis, as reflected by a decrease in iodine-staining capacity, which is measured spectrophotometrically. The unit of bacterial alpha-amylase activity is the amount of enzyme required to hydrolyze 10 mg. of starch per minute under the conditions of the procedure. The method is applicable to bacterial alpha-amylases, including industrial preparations, except materials which possess significant saccharifying activity.

From 0.3 to 0.5 grams of solid sample or from 0.3 to 1.0 ml. of a liquid sample is dissolved in a sufficient quantity of 0.0025 M aqueous calcium chloride to give an enzyme solution containing approximately 0.25 unit of activity per ml.

A mixture of 10 ml. of 1% Lintner starch solution, equilibrated to 60°C, and 1 ml. of the enzyme sample to be tested is mixed and held in a 60°C constant temperature bath for exactly 10 minutes. A 1-ml. sample is removed and added to a mixture of 1 ml. of 1 M aqueous hydrochloric acid and about 50 ml. of distilled water. The iodine-staining capacity of such acidified sample then is determined by adding 3.0 ml. of 0.05% aqueous iodine solution, diluting to 100 ml. with distilled water, and mixing well. The absorbance of the solution, relative to that of distilled water, is measured at 620 nm, in a 2-cm. cell. A similar measurement is made of the standard starch solution (to which water is added instead of the enzyme solution) to provide a blank absorbance.

The enzyme activity, in units/gram or /ml. is equal to $$\frac{(\text{Blank Absorbance} - \text{Sample Absorbance}) \times \text{Dilution Factor} \times 50}{\text{Blank Absorbance} \times 10 \times 10}$$

The glucoamylase may be any of the well-known amylase preparations, particularly those derived from members of the Aspergillus genus, the Endomyces genus, and the Rhizopus genus. A particularly preferred glucoamylase is that available from the process described in U.S. Pat. No. 3,042,584 (Kooi et al.) whereby a fungal amylase preparation is freed of undesired transglucosidase activity by treatment in an aqueous medium with a clay mineral. The amount of glucoamylase to be used ranges from about 0.1 unit to about 5.0 units per gram of starch (dry basis). Preferably, on an enzyme cost/performance basis, about 0.25 unit of glucoamylase per gram of starch (dry basis) is used.

Glucoamylase activity units are determined as follows:

The substrate is a 15–18 D.E. acid hydrolysate of corn starch dissolved in water and diluted to 4.0 grams of dry substance per 100 ml. of solution. Exactly 50 ml. of the solution is pipetted into a 100 ml. volumetric flask. To the flask is added 5.0 ml. of 1.0 molar sodium acetate-acetic acid buffer (pH: 4.3). The flask is placed in a water bath at 60°C and after 10 minutes the proper amount of the enzyme preparation is added. At exactly 120 minutes after addition of the enzyme preparation the solution is adjusted to a phenolphthalein end-point with one normal sodium hydroxide. The solution is then cooled to room temperature, and diluted to volume. A reducing sugar value, calculated as dextrose, is determined on the diluted sample and on a control with no enzyme preparation added. Glucoamylase activity is calculated as follows:

$$A = \frac{S - B}{2 \times E}$$

where

A = glucoamylase activity units per ml. (or per gram) of enzyme preparation.
S = reducing sugars in enzyme converted sample, grams per 100 ml.
B = reducing sugars in control, grams per 100 ml.
E = amount of enzyme preparation used, ml. (or grams) "S" should not exceed 1.0 grams per 100 ml.

The glucose isomerase may be any such enzyme capable of converting dextrose to levulose. Many are presently known including principally those elaborated by microorganisms of the Streptomyces genus, including *S. bobiliae*, *S. fradiae*, *S. roseochromogenes*, *S. olivacens*, *S. californicus*, *S. vinacens*, *S. virginiae*, *S. olivochromogenes*, and *S. phaeochromogenes*. Glucose isomerases elaborated by microorganisms of the Arthrobacter genus likewise are contemplated, e.g., *A. nov. sp.* NRRL B-3724, *A. nov. sp.* NRRL B-3735, *A. nov. sp.* NRRL B-3726, *A. nov. sp.* NRRL B-3727 and *A. nov. sp.* NRRL B-3728. So also, glucose isomerases elaborated by microorganism of the Lactobacillus genus, e.g., *L. brevis*, *L. mannitopens* and *L buchneri*. Also, *Aerobacter cloacae* and *A. aerogenes*.

The amount of glucose isomerase to be used ranges from about 0.1 unit to about 20 units per gram of starch (dry basis). In the usual, preferred instance, an amount within the range of from about 0.2 to about 2.0 will be used.

Glucose isomerase activity units are determined as follows:

The procedure involves making a spectrophotometric determination of the ketose produced from a glucose solution under a standardized set of conditions.

The enzyme preparation to be assayed is first diluted to contain from 1 to 6 isomerase units per ml.

A stock solution is prepared as follows:

| Component | Amount |
| --- | --- |
| 0.1 M $MgSO_4 \cdot 7H_2O$ | 1 ml. |
| 0.01 M $CoCl_2 \cdot 6H_2O$ | 1 ml. |
| 1 M Phosphate Buffer, pH 7.5 | 0.5 ml. |
| Anhydrous D-glucose | 1.44 g. |
| Distilled Water | To make up a total volume of 7.5 ml. |

An enzymatic isomerization is conducted by adding 1 ml. of the enzyme preparation to 3 ml. of the stock solution, then incubating it for 30 minutes at 60°C. At the end of this incubation period, a 1-ml. aliquot is taken and quenched in 9 ml. of 0.5 N perchloric acid. The quenched aliquot then is diluted to a total volume of 250 ml. As a control, for comparative purposes, the procedure is repeated substituting 1 ml. of water for the 1 ml. of the enzyme preparation in solution form, at the beginning of the incubation period.

The ketose then is determined by a cysteine-sulfuric acid method. See Dische et al, J. Biol. Chem. 192, pg. 583 (1951). For the purposes of this assay, one glucose isomerase unit is defined as the amount of enzyme activity required to produce one micromole of levulose per minute under the isomerization conditions described.

The temperature of the reaction mixture of the process herein should as indicated be from about 40°C to about 70°C. Ordinarily, the temperature will be at the upper end of this range, consistent with the requirement that it be below the temperature at which the starch is gelatinized. A particular advantage of the process is the fact that high temperatures are avoided. This permits a considerable savings in the cost of supplying heat to the process and minimizes the formation of color bodies with a subsequent savings in refining costs.

The selection of pH depends upon the particular enzymes used in the process. Ideally, the thinning, saccharifying and glucose isomerase enzymes would exhibit their optimum activities at about the same pH, but as a practical matter this is unlikely. Glucoamylase is of course the saccharifying enzyme and its optimum activity is in the range of 3.5–5.0 pH. Alpha-amylase's optimum activity is at a pH within the range of 5.5–7 and is not sufficiently active at a pH below 5 to promote the desired starch solubilization. The glucose isomerases generally are most active at still higher pH's, e.g., in the order of 7.0–9.0. It is thus unexpected to find that all three of these enzymes will act cooperatively at one pH, as in fact they do. A suitable pH for the purposes of the invention herein is one falling within the range of from about 5.0 to about 7.0.

The hydrolysis mixture should contain magnesium and cobalt ions. These may be supplied in the form of magnesium sulfate hexahydrate ($MgSO_4 \cdot 6H_2O$) and cobalt chloride heptahydrate ($CoCl_2 \cdot 7H_2O$). The amounts of these salts or of other water soluble magnesium and cobalt salts, should be such as to provide from about 0.005 to about 0.10 moles per liter of magnesium and from about 0.0001 to about 0.005 moles per liter of cobalt ions. These ions in these concentrations enhance the activity of the isomerase and appear not to have an adverse effect on the activity of the other enzymes.

Although the calcium ion is known to have a beneficial affect on the activity of alpha-amylases, it is unnecessary to add it to the conversion mixtures of this invention and, in certain preferred instances, it is advisable not to add any because it appears to have an adverse effect on the activity of the glucose isomerase and, correspondingly, on the ultimate yield of levulose.

The invention is illustrated in some detail by the following examples which, however, are not to be taken as limiting in any respect.

EXAMPLE 1

A 25% by weight aqueous slurry of granular corn starch is prepared containing the following ingredients:
125 g. of corn starch
250 ml. of 1.0 N aqueous potassium phosphate buffer, pH: 7.5
5 ml. of 1.0 N magnesium sulfate hexahydrate
5 ml. of 0.1 N cobalt chloride heptahydrate
Sufficient aqueous calcium chloride to provide 100 ppm of calcium ion
Alpha-amylase (*Bacillus licheniformis*, 5 activity units/g of starch (dry basis))
Glucoamylase (1.0 activity units/g of starch (dry basis))
Glucose isomerase (Streptomyces olivochromogenes, 10 activity units/g of starch (dry basis))

The above aqueous slurry is maintained at 60°C for 24 hours, the pH being adjusted to 6.0 as necessary by additions of aqueous potassium hydroxide. The conversion mixture is filtered and the filtrate adjusted to a pH of 4.5 by the addition of hydrochloric acid, then boiled to inactivate the enzymes. The solids material comprises 44.9% of the original granular starch, which means that 55.1% of the granular starch is solubilized. This solubilized starch product is found to have a dextrose content of 51.2% and a ketose (levulose) content of 20.6%, both based on solids content.

EXAMPLE 2

The procedure of Example 1 is repeated except that the pH is maintained at 6.5 throughout. The proportion of starch solubilized is 48.8% and the dextrose content of that solubilized portion is 36.1; the ketose (levulose) content is 23.0%.

All parts and percentages herein unless otherwise expressly stated are by weight.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A process for the direct conversion of granular starch to levulose, comprising forming an aqueous slurry of granular starch, bacterial alpha-amylase, glucoamylase and glucose isomerase, at a temperature of at least about 40°C and below the temperature at which the starch is gelatinized, at a pH of from about 5 to about 7 and maintaining the conditions of temperature and pH so that the insoluble starch retains its essentially granular form while a soluble starch hydrolysate containing levulose is produced, whereby any residual insoluble starch remains in essentially granular, ungelatinized form.

2. The process of claim 1 wherein the starch is corn starch.

3. The process of claim 1 wherein the concentration of starch is from about 10% to about 70%.

4. The process of claim 1, wherein the amount of bacterial alpha amylase used is such as to provide from about 1.0 to about 25 alpha-amalyse units of activity per gram of dry starch.

5. The process of claim 1, wherein the amount of glucoamylase used is such as to provide from about 0.1 to about 5.0 glucoanalyse units of activity per gram of dry starch.

6. The process of claim 1, wherein the amount of glucose isomerase used is such as to provide from about 0.1 to about 20 glucose isomerase units of activity per gram of dry starch.

7. The process of claim 1, wherein the conversion mixture is substantially free of calcium ion.

8. The process of claim 1, wherein the bacterial alpha-amylase is derived from a Bacillus microorganism.

9. The process of claim 1, wherein the glucoamylase is derived from a fungal source.

10. The process of claim 1, wherein the glucose isomerase is derived from a Streptomyces microorganism.

11. The process of claim 1, wherein the glucose isomerase is derived from an Arthrobacter microorganism.

12. A process for the direct conversion of granular starch to levulose, comprising forming an aqueous slurry of granular starch, a bacterial alpha-amylase enzyme preparation derived from *Bacillus lichiniformis*, a glucoamylase enzyme preparation and a glucose isomerase enzyme preparation, at a temperature of at least about 40°C and below the temperature at which the starch is gelatinized, at a pH of from about 5 to 7, maintaining these conditions during enzymatic action so that the unsolublized starch remains in ungelatinized form while a soluble starch hydrolysate containing levulose is being produced, whereby any residual insoluble starch in the conversion mixture is not gelatinized.

13. The process of claim 12, wherein said bacterial alpha-amylase enzyme is derived from a *Bacillus licheniformis* strain of the group consisting of NCIB 8061, NCIB 8059, ATCC6598, ATCC6634, ATCC 8480, ATCC 9945A and ATCC 11945.

14. The process of claim 12, wherein 90% or more of the starch is solubilized.

15. The process of claim 12, wherein the undissolved starch is recycled.

16. The process of claim 12, wherein the glucose isomerase is derived from a microorganism of the genus Streptomyces.

* * * * *

UNITED STATES PATENT AND TRADEMARK OFFICE
CERTIFICATE OF CORRECTION

PATENT NO. : 3,922,201
DATED : November 25, 1975
INVENTOR(S) : Ronald E. Hebeda et al Page 1 of 2

It is certified that error appears in the above-identified patent and that said Letters Patent are hereby corrected as shown below:

Column 1, line 50, change "alphaamylase" to --alpha-amylase--.

Column 3, line 55, change "Novo B. substilis" to --Novo B. subtilis--.

Column 4, line 12, change "grams" to --gram--.

Column 5, line 26, change "NRRL B-3735" to --NRRL B-3725--.

Column 6, line 23, change "pH's" to --pHs--.

Column 6, line 43, change "affect" to --effect--.

Column 6, lines 67-68, change "Streptomyces olivochromogenes" to --Streptomyces olivochromogenes--.

Column 8, line 2, change "alpha amylase" to --alpha-amylase--.

Column 8, line 7, change "glucoanalyse" to --glucoamylase--.

Column 8, line 26, change "lichiniformis" to --licheniformis--.

UNITED STATES PATENT AND TRADEMARK OFFICE
CERTIFICATE OF CORRECTION

PATENT NO. : 3,922,201
DATED : November 25, 1975
INVENTOR(S) : Ronald E. Hebeda et al Page 2 of 2

It is certified that error appears in the above—identified patent and that said Letters Patent are hereby corrected as shown below:

Column 8, line 39, change "ATCC6598, ATCC6634" to --ATCC 6598, ATCC 6634--.

Signed and Sealed this twenty-fifth Day of May 1976

[SEAL]

Attest:

RUTH C. MASON
Attesting Officer

C. MARSHALL DANN
Commissioner of Patents and Trademarks